(12) United States Patent
Wang

(10) Patent No.: US 11,481,625 B2
(45) Date of Patent: Oct. 25, 2022

(54) ARTIFICIAL NEURAL NETWORK

(71) Applicant: Nokia Technologies Oy, Espoo (FI)

(72) Inventor: Meng Wang, Nanjing (CN)

(73) Assignee: Nokia Technologies Oy, Espoo (FI)

( * ) Notice: Subject to any disclaimer, the term of this patent is extended or adjusted under 35 U.S.C. 154(b) by 450 days.

(21) Appl. No.: 16/635,652

(22) PCT Filed: Aug. 4, 2017

(86) PCT No.: PCT/CN2017/096004
§ 371 (c)(1),
(2) Date: Jan. 31, 2020

(87) PCT Pub. No.: WO2019/024083
PCT Pub. Date: Feb. 7, 2019

(65) Prior Publication Data
US 2021/0125050 A1     Apr. 29, 2021

(51) Int. Cl.
G06E 1/00 (2006.01)
G06N 3/08 (2006.01)
G06N 3/04 (2006.01)

(52) U.S. Cl.
CPC ............. *G06N 3/08* (2013.01); *G06N 3/0454* (2013.01)

(58) Field of Classification Search
CPC ............................... G06N 3/08; G06N 3/0454
See application file for complete search history.

(56) References Cited

U.S. PATENT DOCUMENTS

| 6,601,051 | B1 | 7/2003 | Lo et al. |
| 9,508,340 | B2 | 11/2016 | Parada San Martin et al. |
| 2002/0018127 | A1* | 2/2002 | Tani ............... G05B 13/027 348/222.1 |
| 2003/0169369 | A1 | 9/2003 | Kahn |
| 2004/0162644 | A1* | 8/2004 | Torii ............... G05D 1/0825 701/1 |
| 2005/0197983 | A1 | 9/2005 | Tani |
| 2016/0180215 | A1 | 6/2016 | Vinyals et al. |

(Continued)

FOREIGN PATENT DOCUMENTS

| CN | 104952448 A | 9/2015 |
| CN | 105279495 A | 1/2016 |
| CN | 108228686 A * | 6/2018 ........... G06F 16/583 |

OTHER PUBLICATIONS

Hotelling, "Relations Between Two Sets of Variates", Biometrika, vol. 25, No. 3/4, Dec. 1936, pp. 321-377.

(Continued)

*Primary Examiner* — Xin Jia
(74) *Attorney, Agent, or Firm* — Nokia Technologies Oy

(57) ABSTRACT

There is provided an apparatus comprising at least one processing core, at least one memory including computer program code, at least one memory and the computer program code being configured to, with at least one processing core, cause the apparatus at least to obtain, from a first sequential input (102), a first output from a first recurrent neural network, the first sequential input being of a first modality, obtain, from a second sequential input (103), a second output from a second recurrent neural network, the second sequential input being of a second modality, and process the first output and the second output to obtain a correlation of the first and second sequential inputs.

19 Claims, 5 Drawing Sheets

(56) References Cited

U.S. PATENT DOCUMENTS

| | | | |
|---|---|---|---|
| 2016/0342895 A1 | 11/2016 | Gao et al. | |
| 2017/0150235 A1* | 5/2017 | Mei | H04N 21/8405 |
| 2017/0206464 A1* | 7/2017 | Clayton | G06N 3/0454 |

OTHER PUBLICATIONS

Hardoon et al., "Canonical Correlation Analysis: An Overview with Application to Learning Methods", Neural computation, vol. 16, No. 12, 2004, pp. 2639-2664.
Akaho, "A Kernel Method for Canonical Correlation Analysis", arXiv, Sep. 13, 2006, pp. 1-7.
Bach et al., "Kernel Independent Component Analysis", Journal of Machine Learning Research, vol. 3, 2002, pp. 1-48.
Andrew et al.,"Deep Canonical Correlation Analysis", Proceedings of the 30th International Conference on Machine Learning, JMLR, vol. 28, 9 pages, (Jun. 22, 2022).
Yan et al., "Deep Correlation for Matching Images and Text", IEEE Conference on Computer Vision and Pattern Recognition (CVPR), Jun. 7-12, 2015, pp. 3441-3450.
Verma et al., "Im2Text and Text2Im: Associating Images and Texts for Cross-Modal Retrieval", Proceedings British Machine Vision Conference, 2014, pp. 1-13.
Pereira et al., "On the Role of Correlation and Abstraction in Cross-Modal Multimedia Retrieval", IEEE Transactions on Pattern Analysis and Machine Intelligence, vol. 36, No. 3, Mar. 2014, pp. 521-535.
Gong et al., "A Multi-View Embedding Space for Modeling Internet Images, Tags, and Their Semantics", International Journal of Computer Vision, vol. 106, 2014, pp. 210-233.
Choukri et al., "Adaptation of Automatic Speech Recognizers to New Speakers Using Canonical Correlation Analysis Techniques", Computer Speech & Language, vol. 1, No. 2, Dec. 1986, pp. 95-107.
Arora et al., "Multi-View CCA-Based Acoustic Features for Phonetic Recognition Across Speakers and Domains", IEEE International Conference on Acoustics, Speech and Signal Processing, May 26-31, 2013, pp. 7135-7139.
Chapdelaine et al., "Improving Video Captioning for Deaf and Hearing-Impaired People Based on Eye Movement and Attention Overload", Human Vision and Electronic Imaging XII, vol. 6492, Feb. 12, 2007, 11 pages.
Sargin et al., "Audiovisual Synchronization and Fusion Using Canonical Correlation Analysis", IEEE Transactions on Multimedia, vol. 9, No. 7, Nov. 2007, pp. 1396-1403.
Bredin et al., "Audio-Visual Speech Synchrony Measure for Talking-Face Identity Verification", 2007 IEEE International Conference on Acoustics, Speech and Signal Processing—ICASSP '07, Apr. 15-20, 2007, pp. II 233-II 236.
Yuan et al., "Learning Concept Bundles for Video Search with Complex Queries", MM '11: Proceedings of the 19th ACM international conference on Multimedia, Nov. 2011, pp. 453-462.
Lin et al., "Visual Semantic Search: Retrieving Videos via Complex Textual Queries", IEEE Conference on Computer Vision and Pattern Recognition, Jun. 23-28, 2014, pp. 2657-2664.
Hochreiter et al., "Long Short-Term Memory", Neural Computation, vol. 9, No. 8, 1997, pp. 1735-1780.
Lai et al., "Kernel and Nonlinear Canonical Correlation Analysis", International Journal of Neural Systems, vol. 10, No. 5, 2000, pp. 365-377.
Fukumizu et al., "Statistical Consistency of Kernel Canonical Correlation Analysis", Journal of Machine Learning Research, vol. 8, 2007, pp. 361-383.
Via et al., "A Learning Algorithm for Adaptive Canonical Correlation Analysis of Several Data Sets", Neural Networks, vol. 20, No. 1, Jan. 2007, pp. 139-152.
Sharma et al., "Generalized Multiview Analysis: A Discriminative Latent Space", IEEE Conference on Computer Vision and Pattern Recognition, Jun. 16-21, 2012, pp. 2160-2167.
Yamanishi et al., "Extraction of Correlated Gene Clusters from Multiple Genomic Data by Generalized Kernel Canonical Correlation Analysis", Bioinformatics, vol. 19, No. suppl 1, 2003, pp. i323-i330.
Pineda, "Generalization of back-propagation to recurrent neural networks", Physical review letters, vol. 59, No. 19, Nov. 9, 1987, pp. 2229-2232.
Werbos, "Generalization of Backpropagation with Application to a Recurrent Gas Market Model", Neural Networks, vol. 1, No. 4, 1988, pp. 339-356.
Williams et al., "Gradient-Based Learning Algorithms for Recurrent Networks and Their Computational Complexity", Backpropagation: Theory, Architectures, and Applications, Jan. 1995, pp. 433-486.
Krizhevsky et al., "ImageNet Classification with Deep Convolutional Neural Networks", Advances in Neural Information Processing Systems, 2012, pp. 1-9.
Szegedy et al., "Going Deeper with Convolutions", IEEE Conference on Computer Vision and Pattern Recognition (CVPR), Jun. 7-12, 2015, pp. 1-9.
Simonyan et al., "Very Deep Convolutional Networks for Large-Scale Image Recognition", arXiv, Sep. 4, 2014, pp. 1-10.
He et al., "Deep Residual Learning for Image Recognition", arXiv, Dec. 10, 2015, pp. 1-12.
Graves et al., "Speech Recognition with Deep Recurrent Neural Networks", IEEE International Conference on Acoustics, Speech and Signal Processing, May 26-31, 2013, pp. 6645-6649.
Sutskever et al., "Sequence to Sequence Learning with Neural Networks", Advances in Neural Information Processing Systems, 2014, pp. 1-9.
Donahue et al., "Long-Term Recurrent Convolutional Networks for Visual Recognition and Description", The IEEE Conference on Computer Vision and Pattern Recognition (CVPR), 2015, pp. 2625-2634.
Ng et al., "Beyond Short Snippets: Deep Networks for Video Classification", The IEEE Conference on Computer Vision and Pattern Recognition (CVPR), 2015, pp. 4694-4702.
Zaremba et al., "Recurrent Neural Network Regularization", arXiv, Sep. 8, 2014, 5 pages.
Srivastava et al., "Unsupervised Learning of Video Representations using LSTMs", arXiv, Feb. 16, 2015, 12 pages.
Xu et al., "MSR-VTT: A Large Video Description Dataset for Bridging Video and Language", IEEE Conference on Computer Vision and Pattern Recognition (CVPR), Jun. 27-30, 2016, pp. 5288-5296.
Rasiwasia et al., "A New Approach to Cross-Modal Multimedia Retrieval", Proceedings of the 18th ACM international conference on Multimedia, Oct. 2010, pp. 251-260.
Yang et al., "Deep Multimodal Representation Learning from Temporal Data", arXiv, Apr. 11, 2017, 9 pages.
Zhu et al., "Uncovering Temporal Context for Video Question and Answering", arXiv, Nov. 15, 2015, pp. 1-10.
Kaufman et al., "Temporal Tessellation for Video Annotation and Summarization", arXiv, Dec. 21, 2016, pp. 1-8.
Cao et al., "Deep Visual-Semantic Hashing for Cross-Modal Retrieval", Proceedings of the 22nd ACM SIGKDD International Conference on Knowledge Discovery and Data Mining, Aug. 2016, pp. 1445-1454.
Malinowski et al., "Ask Your Neurons: A Deep Learning Approach to Visual Question Answering", arXiv, Nov. 24, 2016, pp. 1-27.
Liu et al., "Correlation-Based Retrieval for Heavily Changed Near-Duplicate Videos", ACM Transactions on Information Systems (TOIS), vol. 29, No. 4, Article 21, Nov. 2011, 25 pages.
Li et al., "Person Search with Natural Language Description", arXiv, Feb. 19, 2017, 10 pages.
Mikolov et al., "Distributed Representations of Words and Phrases and their Compositionality", arXiv, Oct. 16, 2013, pp. 1-9.
Karpathy et al., "Deep Visual-Semantic Alignments for Generating Image Descriptions", The IEEE Conference on Computer Vision and Pattern Recognition (CVPR), 2015, pp. 3128-3137.
Haija et al., "YouTube-8M: A Large-Scale Video Classification Benchmark", arXiv, Sep. 27, 2016, 10 pages.

(56) References Cited

OTHER PUBLICATIONS

"Canonical Correlation", Wikipedia, Retrieved on Jan. 30, 2020, Webpage available at: https://en.wikipedia.org/wiki/Canonical_correlation.

"Feedforward Neural Network", Wikipedia, Retrieved on Jan. 30, 2020, Webpage available at: https://en.wikipedia.org/wiki/Feedforward_neural_network.

International Search Report and Written Opinion received for corresponding Patent Cooperation Treaty Application No. PCT/CN2017/096004, dated May 2, 2018, 11 pages.

\* cited by examiner

ARTIFICIAL NEURAL NETWORK

RELATED APPLICATION

This application was originally filed as PCT Application No. PCT/CN2017/096004, filed on Aug. 4, 2017.

FIELD

The present invention relates to artificial neural networks and deriving correlations between input sequences.

BACKGROUND

Artificial neural networks may be configured in different ways. In general, an artificial neural network, which will be referred to herein as simply a neural network, comprises artificial neurons, which likewise will be referred to herein simply as neurons. The neurons may be configured to receive inputs, apply weights and provide outputs based on the inputs and the weights, for example. The neurons may be implemented in software, or, additionally or alternatively, a neural network may comprise hardware-based artificial neurons.

Neural networks may be classified into different types based on their properties and configuration. A feedforward neural network is one where connections between neurons do not form cycles, that is, where data flows unidirectionally. An example of a feedforward type neural network is a convolutional neural network, CNN, where a filter is used to apply a convolutional operation to data in a preceding layer, to obtain data for a subsequent layer. CNNs may comprise fully connected layers, where each neuron is connected with each neuron in a preceding layer. CNNs have been employed in image classification, for example. CNNs have achieved, in limited settings, classification performance levels that are comparable to humans.

Recurrent neural networks, RNN, on the other hand, are networks where connections between neurons form a directed cycle. These networks enable processing of sequential data due to their internal memory, and RNNs may operate on the linear progression of time, combining a previous time step and a hidden representation into the representation for the current time step. RNNs have been employed in speech recognition and connected, unsegmented handwriting recognition, for example.

Recursive neural networks apply a set of weights recursively over a structure, to produce structured prediction with respect to input structures which may have varying sizes. Recurrent neural networks are one form of recursive neural networks.

SUMMARY OF THE INVENTION

The invention is defined by the features of the independent claims. Some specific embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to obtain, from a first sequential input, a first output from a first recurrent neural network, the first sequential input being of a first modality, obtain, from a second sequential input, a second output from a second recurrent neural network, the second sequential input being of a second modality, and process the first output and the second output to obtain a correlation of the first and second sequential inputs.

Various embodiments of the first aspect may comprise at least one feature from the following bulleted list:

- the first recurrent neural network and the second recurrent neural network each comprise plural long short term memory, LSTM, blocks
- the first recurrent neural network comprises a first number of long short term memory, LSTM, blocks and the second recurrent neural network comprises a second number of LSTM blocks, the first number and the second number being unequal
- the at least one memory and the computer program code are configured to, with the at least one processing core, cause the apparatus to process the first output and the second output by rendering the first output and the second output to have equal dimensions prior to obtaining an inner product to obtain the correlation
- the at least one memory and the computer program code are configured to, with the at least one processing core, cause the apparatus to render the outputs to have equal dimensions by employing a linear transformation
- the first modality and the second modality are different from each other
- the first modality is selected from the following list: video, textual sentence, speech, handwritten text, stereo video, image sequence, aircraft control states and aircraft system outputs
- the second modality is selected from the following list: video, textual sentence, speech, handwritten text, stereo video, image sequence, aircraft control states and aircraft system outputs
- sequential input comprises an input comprising a sequence of input elements.

According to a second aspect of the present invention, there is provided a method, comprising obtaining, from a first sequential input, a first output from a first recurrent neural network, the first sequential input being of a first modality, obtaining, from a second sequential input, a second output from a second recurrent neural network, the second sequential input being of a second modality, and processing the first output and the second output to obtain a correlation of the first and second sequential inputs.

Various embodiments of the second aspect may comprise at least one feature from the following bulleted list:

- the first recurrent neural network and the second recurrent neural network each comprise plural long short term memory, LSTM, blocks
- the first recurrent neural network comprises a first number of long short term memory, LSTM, blocs and the second recurrent neural network comprises a second number of LSTM blocks, the first number and the second number being unequal
- the first output and the second output are processed by rendering the first output and the second output to have equal dimensions prior to obtaining an inner product to obtain the correlation
- the outputs are rendered to have equal dimensions by employing a linear transformation.
- the first modality and the second modality are different from each other
- the first modality is selected from the following list: video, textual sentence, speech, handwritten text, stereo video, image sequence and traffic pattern the second modality is selected from the following list: video, textual sentence, speech, handwritten text, stereo video, image sequence and traffic pattern sequential input comprises an input comprising a sequence of input elements.

According to a third aspect of the present invention, there is provided an apparatus comprising means for obtaining, from a first sequential input, a first output from a first recurrent neural network, the first sequential input being of a first modality, means for obtaining, from a second sequential input, a second output from a second recurrent neural network, the second sequential input being of a second modality, and means for processing the first output and the second output to obtain a correlation of the first and second sequential inputs.

According to a fourth aspect of the present invention, there is provided a non-transitory computer readable medium having stored thereon a set of computer readable instructions that, when executed by at least one processor, cause an apparatus to at least obtain, from a first sequential input, a first output from a first recurrent neural network, the first sequential input being of a first modality, obtain, from a second sequential input, a second output from a second recurrent neural network, the second sequential input being of a second modality, and process the first output and the second output to obtain a correlation of the first and second sequential inputs.

According to a fifth aspect of the present invention, there is provided a computer program configured to cause a method in accordance with the second aspect to be performed.

EMBODIMENTS

An artificial neural network architecture is herein described, which is usable in obtaining a correlation coefficient descriptive of a level of correlation between distinct sequences of input data, which need not be of a same modality. For example, the input sequences may comprise data of different media formats or media types, such as a video sequence and a sentence of text. Recurrent neural networks are employed to characterize each input sequence before deriving the correlation coefficient.

Figure 1:
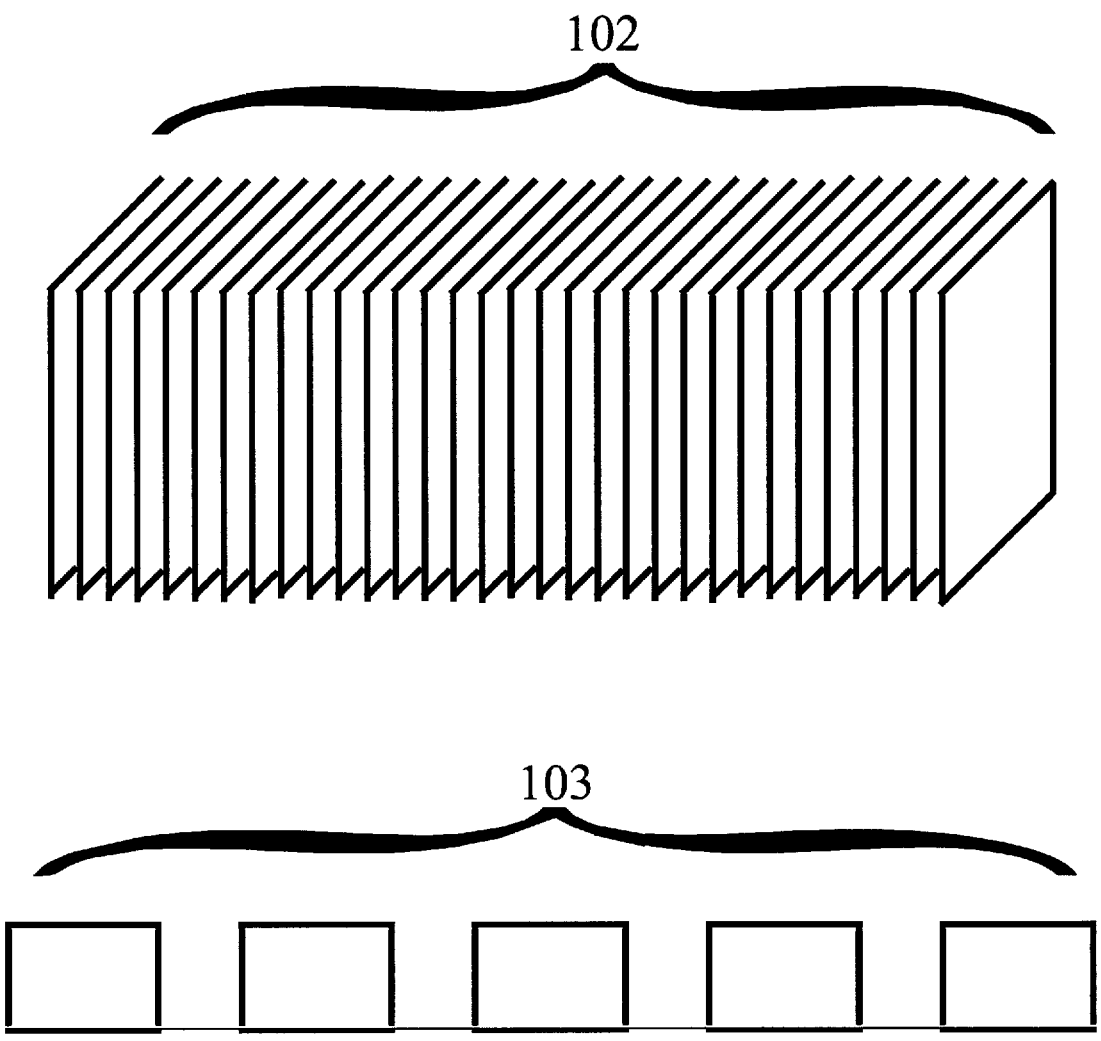
FIG. 1 illustrates sequential inputs usable with at least some embodiments of the present invention.

FIG. 1 illustrates sequential inputs usable with at least some embodiments of the present invention. A first input sequence 102 is illustrated in the upper part of the figure and a second input sequence 103 is illustrated in the lower part of the figure. For example, first input sequence 102 may comprise a video clip comprising a plurality of still video frames. Second input sequence 103 may comprise, for example, a sentence comprising a sequence of words of a natural language, such as Chinese or French.

A video clip may be stored by storing, separately, each still video frame on a storage medium. Since storing each frame separately may require a great deal of storage capacity, video clips are often stored in encoded format wherein the still frames are not each separately stored but frames are stored with reference to each other. This may enable a large saving of storage capacity, since depending on the contents of the video, sequential frames often share a portion of their content, wherefore storing such shared content repeatedly is unnecessary. When a video clip is stored in encoded format, the individual still video frames of the clip may be generated from the encoded clip by performing a decoding operation.

Neural networks may be used to classify still images. Convolutional feedforward networks may be used to determine, for example, whether a specific still image depicts a certain class of object, for example, whether there is a pedestrian in a still image generated from a dashboard camera. Recurrent neural networks, RNN, on the other hand, may be used in processing sequences of data, such as sentences in natural language. For example, machine translation from one natural language to another may rely on RNNs. The quality of machine translations has improved markedly in recent years as RNN-based solutions have been taken into use.

Long short-term memory, LSTM, RNNs have been employed in translating events of a video clip to natural language format. LSTMs are RNN blocks which may comprise a memory cell and three gates. LSTMS may lack activation functions within the recurrent components inside an LSTM unit. For example, a collision of two planets in a video clip might be rendered, using an LSTM-based RNN, as "two spheres collide" in natural language. However, to date such systems have only achieved low rates of success, making them impractical. At least some embodiments of the present invention relate to a related, but different, task of obtaining a correlation between sequential inputs, for example a video clip and a sentence. The sentence may be in natural language. The inventors have realized that obtaining a correlation between two sequential inputs is more readily achievable than translating one sequential input into another, for example to another modality such as video to sentence.

By a modality it is herein meant a type of data. Examples of modalities include video, textual sentence, speech, handwritten text, stereo video, image sequence and traffic pattern. In some embodiments, modalities may include different video encoding methods, such as mpeg4, HEVC and VP9. Modalities may include colour video and black-and-white video. Modalities may comprise different media types, such as video, text, audio and moving images without audio.

Now, a brief introduction to canonical correlation analysis, CCA, is given. Given two views of data $X \in \mathbb{R}^{d_1 \times M}$ and $Y \in \mathbb{R}^{d_2 \times M}$, where M is the number of the samples, and $d_1$ and $d_2$ are the feature dimensions in the two views, respectively, CCA aims to project them into a unified feature space where they are maximally correlated. Denote the two projection matrices as $W_X$ and $W_Y$ respectively, and then the objective of CCA can be written as follows, $$\rho = \max_{W_X, W_Y} \text{corr}(W_X^T X, W_Y^T Y) = \max_{W_X, W_Y} \frac{W_X^T \Sigma_{XY} W_Y}{\sqrt{W_X^T \Sigma_{XX} W_X} \sqrt{W_Y^T \Sigma_{YY} W_Y}}, \quad (1)$$

where $\Sigma_{XX}$ and $\Sigma_{YY}$ are the within-set covariance matrices, and $\Sigma_{XY}$ ($\Sigma_{XY} = \Sigma_{XY}^T$) is the between-set covariance matrix. Eqn. (1) equals to, $$\rho = W_X^T \Sigma_{XY} W_Y, \text{ s.t. } W_X^T \Sigma_{XX} W_X = W_Y^T \Sigma_{YY} W_Y = 1. \quad (2)$$

By introducing Lagrangian parameters, Eqn. (2) can be further written as $$f(W_X, W_Y, \lambda_X, \lambda_Y) = \qquad (3)$$
$$W_X^T \Sigma_{XY} W_Y - \frac{\lambda_X}{2}(W_X^T \Sigma_{XX} W_X - 1) - \frac{\lambda_Y}{2}(W_Y^T \Sigma_{YY} W_Y - 1),$$

Then taking derivatives with regard to $W_X$ and $W_Y$ and forcing them to be zero, we obtain $$\Sigma_{XY} W_Y = \lambda_X \Sigma_{XX} W_X, \qquad (4)$$

$$\Sigma_{YX} W_X = \lambda_Y \Sigma_{YY} W_Y. \qquad (5)$$

From Eqn. (4) and Eqn. (5), as well as the constraint of Eqn. (2), it can be easily obtained $$\lambda_X = \lambda_Y = W_X^T \Sigma_{XY} W_Y. \qquad (6)$$

Denote $\lambda = \lambda_X = \lambda_Y$ and assume $\Sigma_{XX}$ is invertible, by taking both Eqn. (5) and Eqn. (6) into account we have $$\Sigma_{YX} \Sigma_{XY}^{-1} \Sigma_{XY} W_Y = \lambda^2 \Sigma_{YY} W_Y. \qquad (7)$$

This is a generalized eigenvector problem. By solving Eqn. (7), one can obtain $W_Y$, and by substituting $W_Y$ in Eqn. (5), the corresponding $W_X$ can also be obtained. With $W_X$ and $W_Y$, one can easily calculate the correlation between two samples in different views based on their projected representations.

CCA has been applied to a variety of tasks, such as multimedia annotation and search [38]. As CCA performs only linear projections, it cannot extract useful features in certain complex situations where relations between variables are nonlinear. A common approach is to use kernel methods [2][4], [19], [20] to project the data into a higher dimension first as those commonly used in support vector machine, SVM, and such kind of method is the aforementioned KCCA. As the design of KCCA follows the idea of CCA except for a kernel method, it can also be easily transformed into a similar eigenvector problem.

In spite of the nonlinearity KCCA achieves, it relies on a fixed kernel, and thus the representation that may be learned by KCCA is inherently limited. On the other hand, re-training KCCA with newly incoming training samples will result in a severe computational cost. The recently proposed DCCA [5] is directed to addressing this issue. Instead of transforming the correlation calculation into an eigenvector problem, DCCA models each modality of data with a specific deep network, and the projections can be learned by a gradient descend method. Yang et al. [40] propose a method that learns representations of temporal data for multimodal fusion. Their work, however, has a different target when compared to embodiments of the present invention. Their target is to fuse two modalities to accomplish a classification task. Certain embodiments of the present approach, in contrast, focus on cross-modality matching. The listed reference is able to learn a joint representation and may be used to perform cross-modality matching, but it is sub-optimal because it does not directly optimize the matching. In addition, it requires the sequences in two modalities have the same length. It is a strong restriction, and this is because its target is just to combine two modalities. For more details about CCA and its extended techniques, one may consult the survey in [2].

Figure 2A:
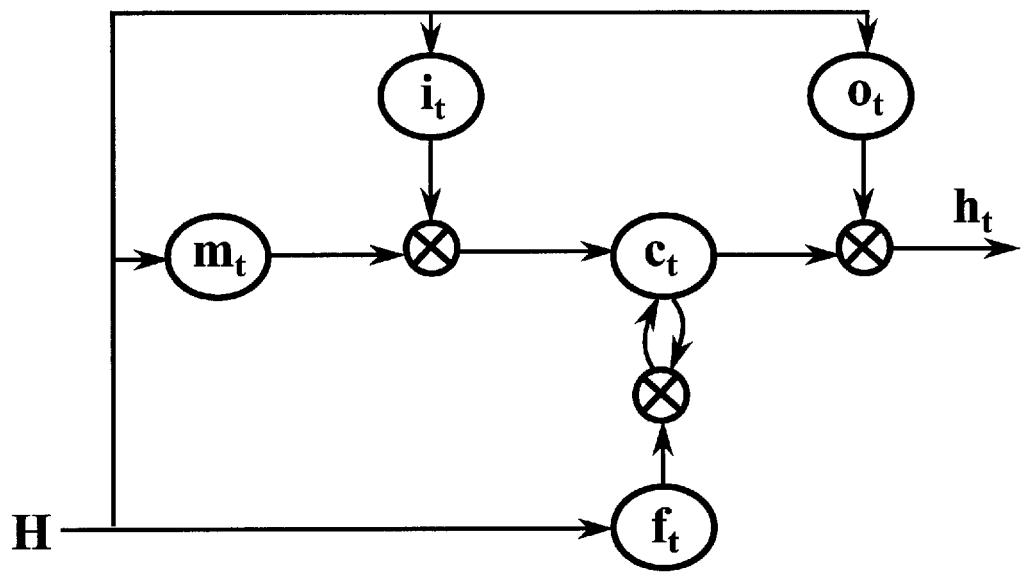
FIG. 2A illustrates an LSTM block.

FIG. 2A illustrates an LSTM block. Recurrent neural networks, RNN, have been investigated for many decades [24][26], and in contrast to the well-known convolutional neural networks, CNNs, [27][30], they are able to store representations of past states. Such a mechanism is important for tasks involving sequential data. However, the networks utilizing recurrent strategy easily encounter gradient vanishing or gradient exploding issue when modeling long term dynamics due to the exponentially changing error signals flowing back in time. The long short-term memory, LSTM, [18] architecture addresses this issue by involving a memory cell and three gates. These enable learning when to forget past states and when to update the current state given new input information. The basic structure of LSTM is shown in FIG. 2A, and the corresponding formulations are as follows:

$$i_t = \sigma(W^{(i)} H), \qquad (8)$$

$$o_t = \sigma(W^{(o)} H), \qquad (9)$$

$$f_t = \sigma(W^{(f)} H), \qquad (10)$$

$$m_t = \phi(W^{(m)} H), \qquad (11)$$

$$c_t = f_t \odot c_{t-1} + i_t \odot m_t, \qquad (12)$$

$$h_t = o_t \odot \phi(c_t), \qquad (13)$$

where $i_t$, $o_t$, $f_t$ are input gate, output gate, forget gate, respectively, and they are designed for controlling the error flowing from different connections. The notation $m_t$ can be also regarded as a special gate, which is used to modulate the input. H is the concatenation of the input of the current unit and the output of the previous hidden unit. The weights of the four gates are denoted as $W^{(i)}$, $W^{(o)}$, $W^{(f)}$ and $W^{(m)}$, respectively. The notation $\odot$ stands for element-wise product, and the memory cell is the summation of two parts, the previous memory modulated by $f_t$, and the current input modulated by $i_t$. The notation $h_t$ is the output of the current hidden unit. The two activation functions commonly used in LSTM are logistic sigmoid function and the hyperbolic tangent function, which are denoted as $\sigma$ and $\phi$, respectively.

Due to the powerfulness in sequence to sequence learning, LSTM has been widely used in speech recognition [31], machine translation [32], image captioning [33], and action recognition [34], for example.

LSTM has been widely applied to sequence to sequence learning problems in the past years. Generally, such tasks can be divided into three groups as mentioned in [33], that is, sequential inputs versus fixed outputs, fixed inputs versus sequential outputs, and sequential inputs versus sequential outputs. Embodiments of the present invention are directed to the third task, which has been demonstrated to be the most challenging one. As the input time steps usually differ from the output time steps, it is challenging to learn a direct mapping from input to output of each time step. To tackle this issue, recent work [35], [36], [36] utilizes an encoder-decoder strategy, see FIG. 4A. The encoder is used to generate a fixed length representation of one sequence, which can be unrolled later by the decoder into the other sequence of any length.

The encoder-decoder type solution can be applied to tasks such as speech recognition, machine translation, and others.

Figure 2B:
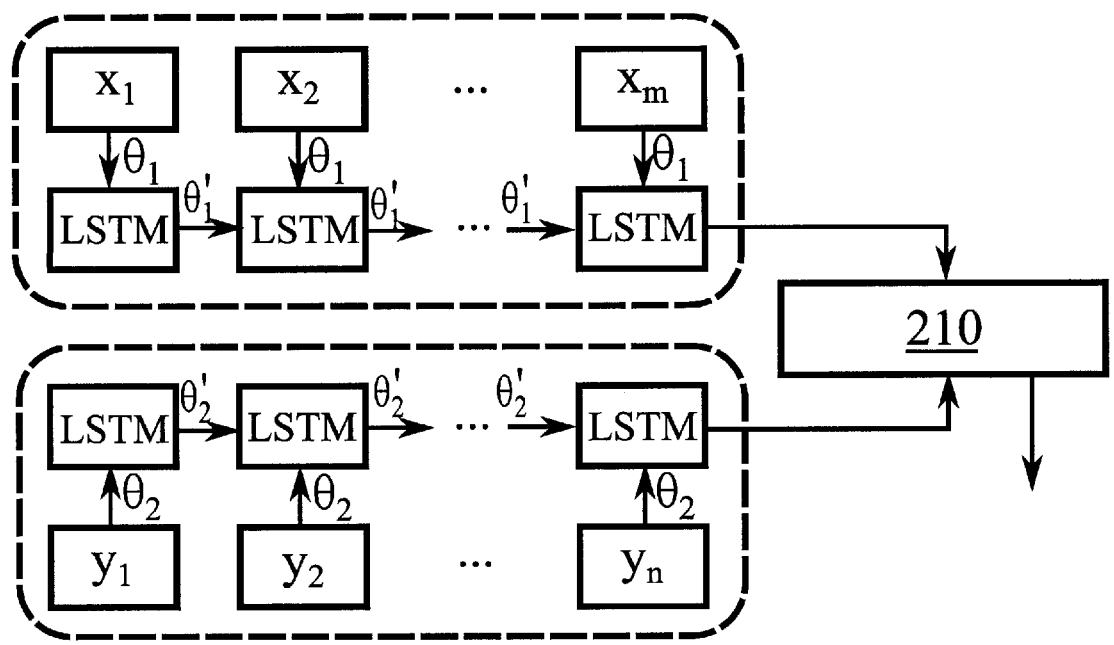
FIG. 2B illustrates an example system in accordance with at least some embodiments of the present invention.

FIG. 2B illustrates an example system in accordance with at least some embodiments of the present invention. The top part is used to model one sequence, x, and the bottom left part is used to model the other sequence, y. The outputs of the two sequences interact through a correlation function 210. Correlation function 210 may be configured to generate a correlation coefficient as output, which is illustrated as a downward pointing arrow in FIG. 2B. Here, the inputs of the neural networks are the two sequences $\{x_1, x_2, \ldots, x_m\}$ and $\{y_1, y_2, \ldots, y_n\}$, and the output is their correlation coefficient. The input sequences may be of different modalities. While LSTM blocks are illustrated in FIG. 2B, other kinds of RNN blocks may be usable in different embodiments of the present invention. The principle of the present invention is herein referred to as deep recurrent correlation neural network, DRCNN.

Generally, DRCNN learns a non-linear projection for each input sequence while preserving the internal dependencies within it. Let $\{x_1, x_2, \ldots, x_m\}$ be an input sequence in the first view, where $x_i \in \mathbb{R}^{d_1}$ is the feature vector of the i-th time step, and let $\{y_1, y_2, \ldots, y_n\}$ be the corresponding input sequence in the second view, where $y_j \in \mathbb{R}^{d_2}$ is the feature vector of the j-th time step. In other words, the input sequences need not be of the same length. As the weights of the LSTM units $(\theta_1, \theta_1', \theta_2, \theta_2')$ are shared through time, the number of time steps in the first view (m) is not necessary equivalent to that in the second view (n). Assume that $f_1$ and $f_2$ are the functions to map the input to the output of each sequence, and then the outputs of the two sequences $z_1$ and $z_2$ can be denoted as:

$$z_1 = f_1(x_1, x_2, \ldots, x_m, \theta_1, \theta_1'), \quad (14)$$

$$z_2 = f_2(y_1, y_2, \ldots, y_n, \theta_2, \theta_2'). \quad (15)$$

As we need to calculate the correlation between two views of data, the dimensionalities of them must be rendered the same. As such, a linear transformation may be adopted on top of each LSTM sequence as follows:

$$p_1 = \alpha_1^T z_1, \quad (16)$$

$$p_2 = \alpha_2^T z_2. \quad (17)$$

Here $p_1$ and $p_2$ can be viewed as representations of the two sequences. Their dimensionalities are controlled by the parameters $\alpha_1$ and $\alpha_2$. Assume that $p_1 \in \mathbb{R}^d$, $p_2 \in \mathbb{R}^d$, and the total number of samples is M. Then, the two views of data used for correlation learning can be denoted as $P_1^* = \mathbb{R}^{d \times M}$ and $P_2^* = \mathbb{R}^{d \times M}$, respectively. As such, the objective of for training DRCNN can be written as:

$$\rho = \max_{\theta_1, \theta_1', \theta_2, \theta_2'} \text{corr}(P_1^*, P_2^*), \quad (18)$$

that is, to maximize the correlation of the representations of the two views. To train the DRCNN, a general practice in network training may be followed, and a mini-batch stochastic gradient descent method may be adopted. The DRCNN framework may comprise two key components, that is, a sequence learning component and a correlation learning component, which may be optimized separately.

Concerning first optimizing the correlation learning component, assume that the training batch size is N, and $P_1 = (p_1^{(1)}, p_1^{(2)}, \ldots, p_1^{(N)}) \in \mathbb{R}^{d \times N}$ and $P_2 = (p_2^{(1)}, p_2^{(2)}, \ldots, p_2^{(N)}) \in \mathbb{R}^{d \times N}$ are the data from the two views in a mini-batch. $1 \in \mathbb{R}^{N \times N}$ is an all-1s matrix. Then, the center data matrices of $P_1$ and $P_2$ can be denoted as $$\overline{P}_1 = P_1 - \frac{T}{N} P_1 1 \text{ and } \overline{P}_2 = P_2 - \frac{1}{N} P_2 1,$$

as respectively. Let $$\Sigma_{11} = \frac{1}{N-1} \overline{P}_1 \overline{P}_1' \text{ and } \Sigma_{22} = \frac{1}{N-1} \overline{P}_2 \overline{P}_2'$$

be the within-set covariance matrices of the two views, and let $$\sum_{12} = \frac{1}{N-1} \overline{P}_1 \overline{P}_2'$$

be the corresponding between-set covariance matrix. Define $S = \Sigma_{11}^{-1/2} \Sigma_{12} \Sigma_{22}^{-1/2}$, and according to [5] Eqn. (16) is equivalent to:

$$\rho = \|S\|_{tr} = tr(S'S)^{1/2}. \quad (19)$$

Assume the singular value decomposition of S is S=UDV', and then similar to the optimization of deep CCA (see appendix of [5]), one can compute the gradient of $\text{corr}(P_1, P_2)$ with respect to $P_1$ as follows:

$$\frac{\partial \text{corr}(P_1, P_2)}{\partial P_1} = \frac{1}{N-1}(2\nabla_{11} \overline{P}_1 + \nabla_{12} \overline{P}_2), \text{ where} \quad (20)$$

$$\nabla_{11} = -\frac{1}{2} \Sigma_{11}^{-\frac{1}{2}} UDU' \Sigma_{11}^{-\frac{1}{2}}, \text{ and} \quad (21)$$

$$\nabla_{12} = -\frac{1}{2} \Sigma_{11}^{-\frac{1}{2}} UDU' \Sigma_{22}^{-\frac{1}{2}}. \quad (22)$$

As mini-batch stochastic gradient descent method is adopted to train the network, the training error should be backward propagated to each sample, and the gradient of $\text{corr}(P_1, P_2)$ w.r.t each $p_1^{(i)}$ can be computed as:

$$\frac{\partial \text{corr}(P_1, P_2)}{\partial p_1^{(i)}} = \frac{1}{N-1}\left(2\nabla_{11}(\overline{P}_1)_{(:,i)} + \nabla_{12}(\overline{P}_2)_{(:,i)}\right) \quad (23)$$

where $(\overline{P}_1)_{(:,i)}$, $(\overline{P}_2)_{(:,i)}$ are the i-th column of $\overline{P}_1$ and $\overline{P}_2$, respectively.

Once $$\frac{\partial \text{corr}(P_1, P_2)}{\partial p_1^{(i)}}$$

is computed, we can compute the gradient of the objective function with respect to the input of each LSTM unit. Note that the approaches to optimize the objectives in the two views may be nearly the same. Therefore, we only show the optimization procedure in the first view for brevity.

Concerning then optimizing the sequence learning component, from Eqn. (8)-(14), we can see that the parameters needed to learn in sequence learning are exactly the weights of the four gates. Assuming that the output of the i-th sample at the last time step in the first view is $h_t$ (i.e., $h_t = z_1^{(i)}$), and the corresponding input at the last time step is H, then we can visualize the data flow as in FIG. 4B. Therefore, the gradient of $h_t$ with regard to H can be computed using the chain rule as follows (see FIG. 4B):

$$\frac{\partial h_t}{\partial H} = \frac{\partial h_t}{\partial o_t}\frac{\partial o_t}{\partial H} + \frac{\partial h_t}{\partial c_t}\frac{\partial c_t}{\partial H} = \quad (24)$$

$$\frac{\partial h_t}{\partial o_t}\frac{\partial o_t}{\partial H} + \frac{\partial h_t}{\partial c_t}\left(\frac{\partial c_t}{\partial m_t}\frac{\partial m_t}{\partial H} + \frac{\partial c_t}{\partial i_t}\frac{\partial i_t}{\partial H} + \frac{\partial c_t}{\partial f_t}\frac{\partial f_t}{\partial H}\right)$$

From the formulations of LSTM (Eqn. (8)-(13)), one can compute the gradients of each parts in Eqn. (21) as follows (a reference about the gradient derivation can also be found in [39]):

$$\frac{\partial h_t}{\partial o_t} = \phi(c_t), \frac{\partial h_t}{\partial c_t} = o_t \odot \phi'(c_t), \quad (25)$$

$$\frac{\partial c_t}{\partial m_t} = i_t, \frac{\partial c_t}{\partial i_t} = m_t, \frac{\partial c_t}{\partial f} = c_{t-1}, \quad (26)$$

$$\frac{\partial o_t}{\partial H} = \sigma'(W^{(o)}H)W^{(o)}, \frac{\partial m_t}{\partial H} = \sigma'(W^{(m)}H)W^{(m)}, \quad (27)$$

$$\frac{\partial i_t}{\partial H} = \sigma'(W^{(i)}H)W^{(i)}, \frac{\partial f_t}{\partial H} = \sigma'(W^{(f)}H)W^{(f)}. \quad (28)$$

It can be seen from FIG. 2B that the output of the sequence at the last time step is exactly the input of the correlation learning component. Therefore, one can easily compute the gradient of the final objective function with respect to H as follows:

$$\frac{\partial \text{corr}(P_1, P_2)}{\partial H} = \frac{\partial \text{corr}(P_1, P_2)}{\partial p_1^{(i)}} \frac{\partial p_1^{(i)}}{\partial z_1^{(i)}} \frac{\partial z_1^{(i)}}{\partial H}, \quad (29)$$

where $\frac{\partial \text{corr}(P_1, P_2)}{\partial p_1^{(i)}}$ can be calculated as in Eqn. (23), $$\frac{\partial p_1^{(i)}}{\partial z_1^{(i)}}$$

can be easily calculated as $p_1^{(i)}$ is a linear transformation of $z_1^{(i)}$ as shown in Eqn. (16), and $$\frac{\partial z_1^{(i)}}{\partial H}$$

can be calculated as in Eqn. (24) (as $h_t = z_1^{(i)}$). As the parameters of the four gates are shared through time, one can easily calculate the gradients at previous time steps using the chain rule in exactly the same way.

Up to now, we have introduced how the DRCNN is trained, that is, how the involved parameters are optimized. Once training is completed, one may compute the correlation coefficient of two sequences by computing the inner product of $p_1$ and $p_2$ (see Eqn. (16) and Eqn. (17)).

DRCNN has been employed in test data to determine how well it functions. With a well-trained DRCNN, different application scenarios become available, such as:

Text-to-video matching, which can facilitate complex-query video search. That means, the query may be a descriptive sentence instead of one or two simple words. Videos may be ranked by computing the matching scores.

Video captioning, which attracts interests in both academia and industry. That means, we generate descriptive sentences for a given video. We can rank several candidate sentences by computing their matching scores with the video.

Video-to-video matching, which can be employed to video recommendation and classification. How to compute the distance of two videos is also a problem. As the DRCNN can generate fixed-dimension representation for a video, we can estimate the distance between videos based on the representations, and this distance well explores the semantic and temporal information of videos.

Here we have only talked about video, but the scheme can also be extended to other media documents. Indeed, input sequences may, in various applications, include aircraft systems outputs which may be correlated with aircraft control states, to, for example, warn pilots the aircraft has entered, or is entering, a stall or state of reduced controllability.

Now preliminary results for a first application scenario are presented, that is, for a complex-query video search. The inventors used the MSR-VTT dataset [37], which contains 200 k video-sentence pairs. 8 k pairs were randomly selected for experiments. 4 k pairs were used for training DRCNN, and the rest were used in a video search experiment. In the video search experiment, 100 sentences were selected and used as queries to perform searches and then to check mean average precision, AP, performance. It was observed that the MAP measurement is 0.35. For comparison, the present approach was compared with CCA and DCCA methods. In these two methods, the video and textual representations were obtained by averaging the features of video frames and words. Clearly, these two methods cannot well explore the temporal information of sequences. The results were that the MAP measurements obtained by CCA and DCCA methods are 0.19 and 0.23, respectively. Thus, the DRCNN approach is able to achieve clearly better performance.

Figure 3:
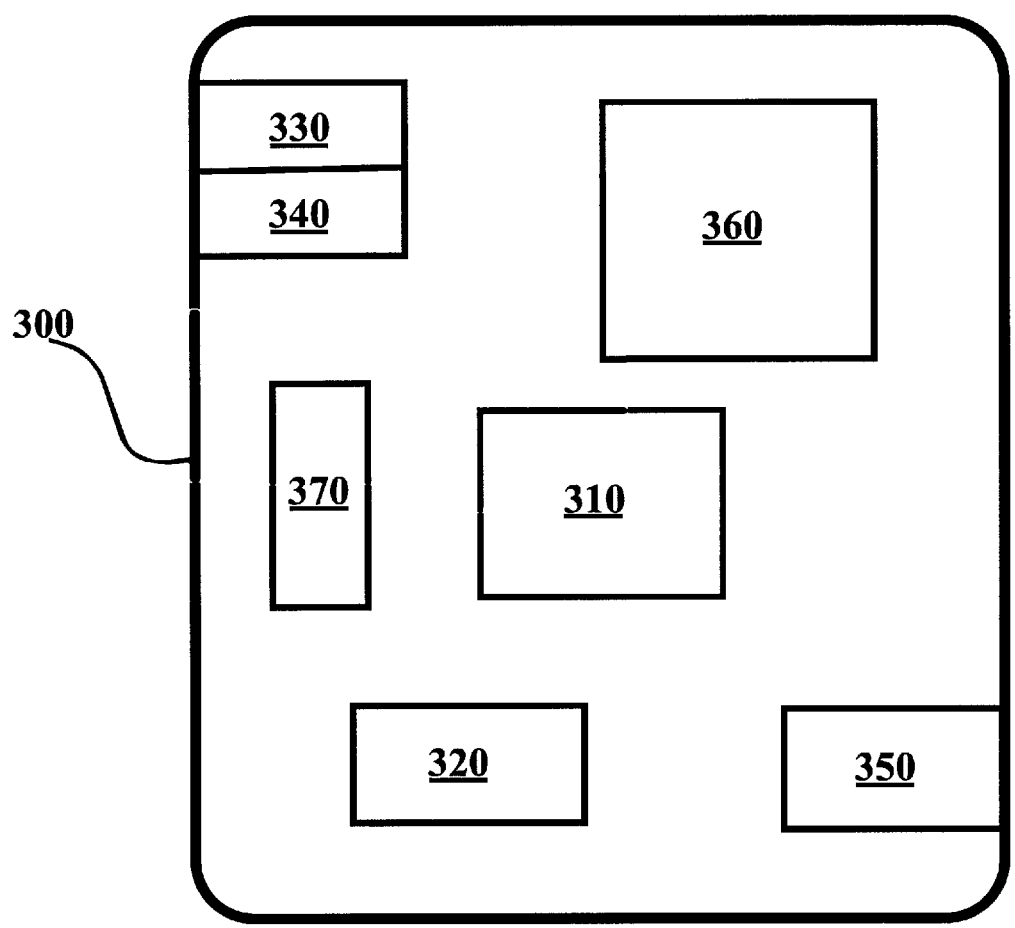
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, server, desktop, laptop or tablet computer. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon, Intel Atom and/or Intel Xeon processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Bluetooth Low Energy or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure machine learning parameters.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4A:
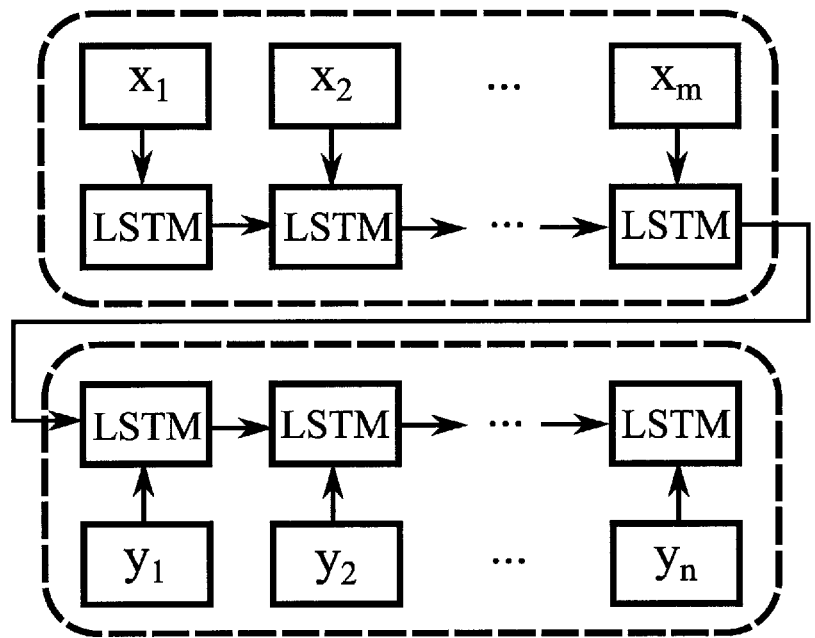
FIG. 4A illustrates an encoder-decoder architecture.

FIG. 4A illustrates the encoder-decoder architecture discussed above. The upper network corresponds in this terminology to the "encoder" part and the lower network to the "decoder" part.

Figure 4B:
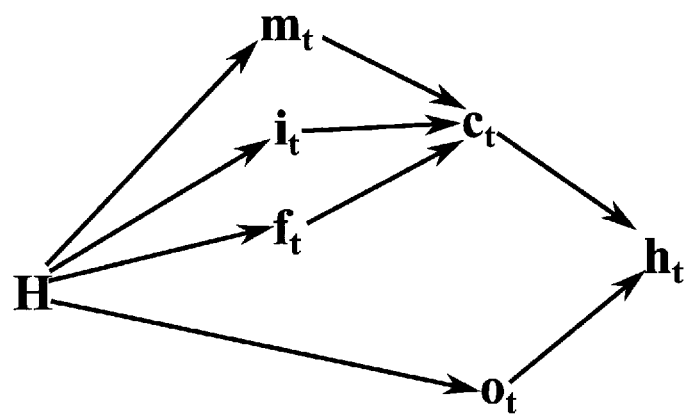
FIG. 4B illustrates data flows in an LSTM block.

FIG. 4B illustrates data flows in one LSTM block. Output vector $h_t$ is influenced by output gate vector $o_t$ and cell state vector $c_t$. Cell state vector $c_t$ is in turn influenced by each of input gate vector $i_t$, forget gate vector $f_t$ and special gate $m_t$.

Figure 5:
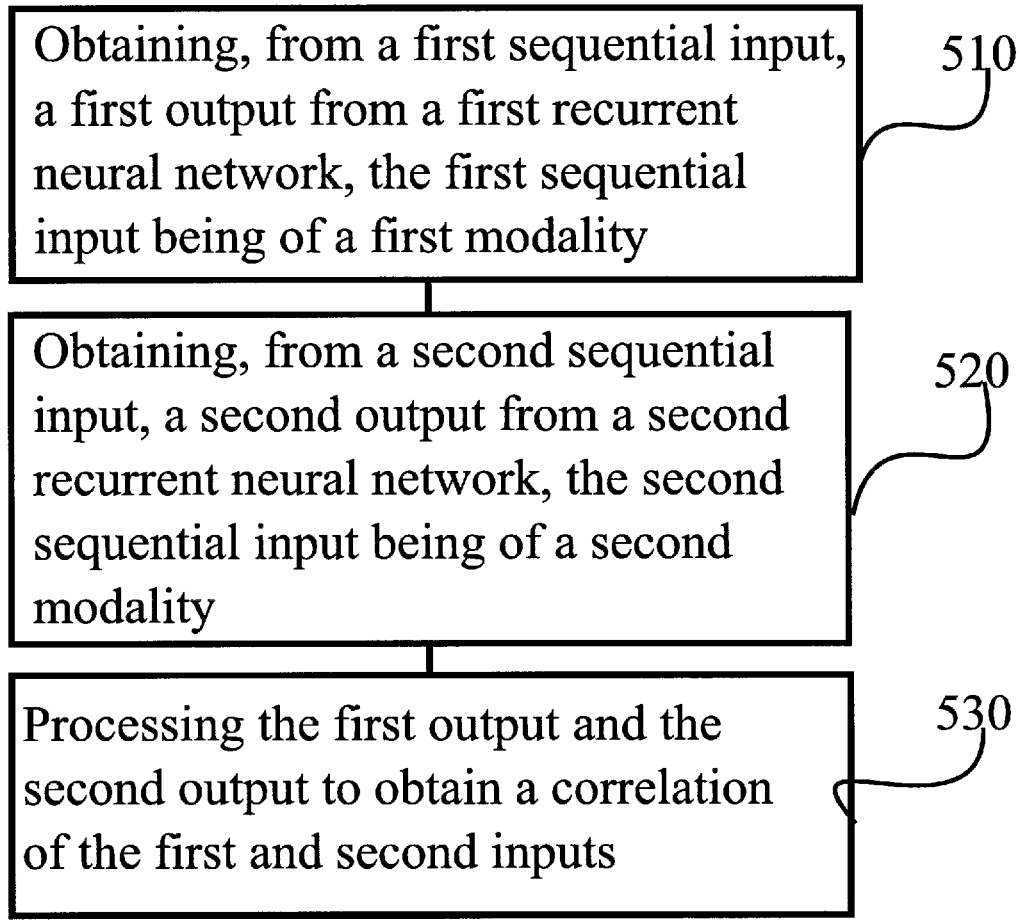
FIG. 5 is a flow graph of a method in accordance with at least some embodiments of the present invention.

FIG. 5 is a flow graph of a method in accordance with at least some embodiments of the present invention. The phases of the illustrated method may be performed in a device, such as a computer or server, configured to perform correlating in accordance with the present invention.

Phase 510 comprises obtaining, from a first sequential input, a first output from a first recurrent neural network, the first sequential input being of a first modality. Phase 520 comprises obtaining, from a second sequential input, a second output from a second recurrent neural network, the second sequential input being of a second modality. Finally, phase 530 comprises processing the first output and the second output to obtain a correlation of the first and second sequential inputs. The processing may comprise obtaining an inner product.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in processing sequential input data using artificial neural networks.

Acronyms List

CCA Canonical correlation analysis
CNN Convolutional neural network
DRCNN Deep recurrent correlation neural network
KCCA Kernel CCA
RNN Recurrent neural network

REFERENCE SIGNS LIST

| | |
|---|---|
| 102 | First input sequence |
| 103 | Second input sequence |
| 210 | Correlation function |
| 300-370 | Structure of the apparatus of FIG. 3 |
| 510-530 | Phases of the method of FIG. 5 |

CITATION LIST

[1] H. Hotelling, "Relations between two sets of variates," Biometrika, vol. 28, no. 3/4, pp. 321-377, 1936.
[2] D. R. Hardoon, S. Szedmak, and J. Shawe-Taylor, "Canonical correlation analysis: An overview with application to learning methods," Neural computation, vol. 16, no. 12, pp. 2639-2664, 2004.
[3] S. Akaho, "A kernel method for canonical correlation analysis," arXiv preprint cs/0609071, 2006.
[4] F. R. Bach and M. I. Jordan, "Kernel independent component analysis," Journal of Machine Learning Research, vol. 3, no. July, pp. 1-48, 2002.
[5] G. Andrew, R. Arora, J. A. Bilmes, and K. Livescu, "Deep canonical correlation analysis." in Proc. ICML, 2013, pp. 1247-1255.
[6] F. Yan and K. Mikolajczyk, "Deep correlation for matching images and text," in Proc. CVPR, 2015, pp. 3441-3450.
[7] Y. Verma and C. Jawahar, "Im2text and text2im: Associating images and texts for cross-modal retrieval." in Proc. BMVC, vol. 1, 2014, p. 2.
[8] J. C. Pereira, E. Coviello, G. Doyle, N. Rasiwasia, G. R. Lanckriet, R. Levy, and N. Vasconcelos, "On the role of correlation and abstraction in cross-modal multimedia retrieval," IEEE Transactions on Pattern Analysis and Machine Intelligence, vol. 36, no. 3, pp. 521-535, 2014.
[9] Y. Gong, Q. Ke, M. Isard, and S. Lazebnik, "A multi-view embedding space for modeling internet images, tags, and their semantics," International Journal of Computer Vision, vol. 106, no. 2, pp. 210-233, 2014.
[10] K. Choukri and G. Chollet, "Adaptation of automatic speech recognizers to new speakers using canonical correlation analysis techniques," Computer Speech & Language, vol. 1, no. 2, pp. 95-107, 1986.
[11] R. Arora and K. Livescu, "Multi-view cca-based acoustic features for phonetic recognition across speakers and domains," in Proc. ICASSP, 2013, pp. 7135-7139.
[12] C. Chapdelaine, V. Gouaillier, M. Beaulieu, and L. Gagnon, "Improving video captioning for deaf and hearing-impaired people based on eye movement and attention overload," in Electronic Imaging 2007, 2007, pp. 64 921K-64 921K.
[13] M. Kahn, "Consumer video captioning system," Mar. 5, 2002, U.S. patent application Ser. No. 10/091,098.
[14] M. E. Sargin, Y. Yemez, E. Erzin, and A. M. Tekalp, "Audiovisual synchronization and fusion using canonical correlation analysis," IEEE Transactions on Multimedia, vol. 9, no. 7, pp. 1396-1403, 2007.
[15] H. Bredin and G. Chollet, "Audio-visual speech synchrony measure for talking-face identity verification," in Proc. ICASSP, vol. 2, 2007, pp. 11-233.
[16] J. Yuan, Z.-J. Zha, Y.-T. Zheng, M. Wang, X. Zhou, and T.-S. Chua, "Learning concept bundles for video search with complex queries," in Proc. ACM MM, 2011, pp. 453-462.
[17] D. Lin, S. Fidler, C. Kong, and R. Urtasun, "Visual semantic search: Retrieving videos via complex textual queries," in Proc. CVPR, 2014, pp. 2657-2664.
[18] S. Hochreiter and J. Schmidhuber, "Long short-term memory," Neural computation, vol. 9, no. 8, pp. 1735-1780, 1997.
[19] P. L. Lai and C. Fyfe, "Kernel and nonlinear canonical correlation analysis," International Journal of Neural Systems, vol. 10, no. 05, pp. 365-377, 2000.
[20] K. Fukumizu, F. R. Bach, and A. Gretton, "Statistical consistency of kernel canonical correlation analysis," Journal of Machine Learning Research, vol. 8, no. February, pp. 361-383, 2007.
[21] J. V'ia, I. Santamar'ia, and J. P'erez, "A learning algorithm for adaptive canonical correlation analysis of several data sets," Neural Networks, vol. 20, no. 1, pp. 139-152, 2007.
[22] A. Sharma, A. Kumar, H. Daume, and D. W. Jacobs, "Generalized multiview analysis: A discriminative latent space," in Proc. CVPR, 2012, pp. 2160-2167.
[23] Y. Yamanishi, J.-P. Vert, A. Nakaya, and M. Kanehisa, "Extraction of correlated gene clusters from multiple genomic data by generalized kernel canonical correlation analysis," Bioinformatics, vol. 19, no. suppl 1, pp. i323-i330, 2003.
[24] F. J. Pineda, "Generalization of back-propagation to recurrent neural networks," Physical review letters, vol. 59, no. 19, p. 2229, 1987.
[25] P. J. Werbos, "Generalization of backpropagation with application to a recurrent gas market model," Neural Networks, vol. 1, no. 4, pp. 339-356, 1988.
[26] R. J. Williams and D. Zipser, "Gradient-based learning algorithms for recurrent networks and their computational complexity," Backpropagation: Theory, architectures and applications, pp. 433-486, 1995.
[27] A. Krizhevsky, I. Sutskever, and G. E. Hinton, "Imagenet classification with deep convolutional neural networks," in Proc. NIPS, 2012.
[28] C. Szegedy, W. Liu, Y. Jia, P. Sermanet, S. Reed, D. Anguelov, D. Erhan, V. Vanhoucke, and A. Rabinovich, "Going deeper with convolutions," in Proc. CVPR, 2015.
[29] K. Simonyan and A. Zisserman, "Very deep convolutional networks for large-scale image recognition," arXiv preprint arXiv:1409.1556, 2014.
[30] K. He, X. Zhang, S. Ren, and J. Sun, "Deep residual learning for image recognition," arXiv preprint arXiv: 1512.03385, 2015.
[31] A. Graves, A.-r. Mohamed, and G. Hinton, "Speech recognition with deep recurrent neural networks," in Proc. ICASSP, 2013, pp. 6645-6649.
[32] I. Sutskever, O. Vinyals, and Q. V. Le, "Sequence to sequence learning with neural networks," in Advances in neural information processing systems, 2014, pp. 3104-3112.
[33] J. Donahue, L. Anne Hendricks, S. Guadarrama, M. Rohrbach, S. Venugopalan, K. Saenko, and T. Darrell, "Long-term recurrent convolutional networks for visual recognition and description," in Proc. CVPR, 2015, pp. 2625-2634.
[34] J. Yue-Hei Ng, M. Hausknecht, S. Vijayanarasimhan, O. Vinyals, R. Monga, and G. Toderici, "Beyond short snippets: Deep networks for video classification," in Proc. CVPR, 2015, pp. 469-4702.
[35] W. Zaremba, I. Sutskever, and O. Vinyals, "Recurrent neural network regularization," arXiv preprint arXiv: 1409.2329, 2014.
[36] N. Srivastava, E. Mansimov, and R. Salakhutdinov, "Unsupervised learning of video representations using lstms," CoRR, abs/1502.04681, vol. 2, 2015
[37] J. Xu, T. Mei, T. Yao, Y. Rui. "MSR-VTT: A Large Video Description Dataset for Bridging Video and Language," in Proc. CVPR 2016.
[38] Nikhil Rasiwasi, Jose Costa Pereira, Emanuele Coviello, Gabriel Doyle, Gert R. G. Lanckriet, Roger Levy, Nuno Vasconcelos, "A New Approach to Cross-Modal Multimedia Retrieval," in Proc. ACM MM, 2010.
[39] Sepp Hochreiter and Jurgen Schmidhuber, "long short-term memory," Neural Computations, vol. 9, no. 8, pp. 1735-1780, 1997.
[40] Yang et al., "Deep Multimodal Representation Learning from Temporal Data," ArXiv, https://arxiv.org/pdf/1704.03152.pdf

What is claimed is:

1. An apparatus comprising at least one processor, and at least one memory including computer program code, the at least one memory and the computer program code being configured to, with the at least one processor, cause the apparatus at least to perform:
   obtain, from a first sequential input, a first output from a first recurrent neural network, the first sequential input being of a first modality;
   obtain, from a second sequential input, a second output from a second recurrent neural network, the second sequential input being of a second modality, and
   process the first output and the second output to obtain a correlation of the first and second sequential inputs.

2. The apparatus according to claim 1, wherein the first recurrent neural network and the second recurrent neural network each comprise plural long short term memory, LSTM, blocks.

3. The apparatus according to claim 1, wherein the first recurrent neural network comprises a first number of long short term memory, LSTM, blocks and the second recurrent neural network comprises a second number of LSTM blocks, the first number and the second number being unequal.

4. The apparatus according to claim 1, wherein the at least one memory and the computer program code are further configured to, with the at least one processor, cause the apparatus to process the first output and the second output by rendering the first output and the second output to have equal dimensions prior to obtaining an inner product to obtain the correlation.

5. The apparatus according to claim 4, wherein the at least one memory and the computer program code are further configured to, with the at least one processor, cause the apparatus to render the outputs to have the equal dimensions by employing a linear transformation.

6. The apparatus according to claim 1, wherein the first modality and the second modality are different from each other.

7. The apparatus according to claim 1, wherein the first modality is selected from a list comprising: video, textual sentence, speech, handwritten text, stereo video, image sequence, aircraft control states and aircraft system outputs.

8. The apparatus according to claim 1, wherein the second modality is selected from a list comprising: video, textual sentence, speech, handwritten text, stereo video, image sequence, aircraft control states and aircraft system outputs.

9. The apparatus according to claim 1, wherein sequential input comprises an input comprising a sequence of input elements.

10. A method, comprising:
    obtaining, from a first sequential input, a first output from a first recurrent neural network, the first sequential input being of a first modality;
    obtaining, from a second sequential input, a second output from a second recurrent neural network, the second sequential input being of a second modality, and
    processing the first output and the second output to obtain a correlation of the first and second sequential inputs.

11. The method according to claim 10, wherein the first recurrent neural network and the second recurrent neural network each comprise plural long short term memory, LSTM, blocks.

12. The method according to claim 10, wherein the first recurrent neural network comprises a first number of long short term memory, LSTM, blocs and the second recurrent neural network comprises a second number of LSTM blocks, the first number and the second number being unequal.

13. The method according to claim 10, wherein the first output and the second output are processed by rendering the first output and the second output to have equal dimensions prior to obtaining an inner product to obtain the correlation.

14. The method according to claim 13, wherein the outputs are rendered to have the equal dimensions by employing a linear transformation.

15. The method according to claim 10, wherein the first modality and the second modality are different from each other.

16. The method according to claim 10, wherein the first modality is selected from a list comprising: video, textual sentence, speech, handwritten text, stereo video, image sequence and traffic pattern.

17. The method according to claim 10, wherein the second modality is selected from a list comprising: video, textual sentence, speech, handwritten text, stereo video, image sequence and traffic pattern.

18. The method according to claim 10, wherein sequential input comprises an input comprising a sequence of input elements.

19. A non-transitory computer readable medium comprising program instructions for causing an apparatus to perform at least the following:
  obtaining, from a first sequential input, a first output from a first recurrent neural network, the first sequential input being of a first modality;
  obtaining, from a second sequential input, a second output from a second recurrent neural network, the second sequential input being of a second modality, and
  processing the first output and the second output to obtain a correlation of the first and second sequential inputs.

\* \* \* \* \*